United States Patent [19]

Bregoli

[11] Patent Number: 4,548,876
[45] Date of Patent: Oct. 22, 1985

[54] INTEGRATED CURRENT COLLECTOR AND CATALYST SUPPORT

[75] Inventor: Lawrence J. Bregoli, Southwick, Mass.

[73] Assignee: The United States of America as represented by the United States Department of Energy, Washington, D.C.

[21] Appl. No.: 661,851

[22] Filed: Oct. 17, 1984

[51] Int. Cl.[4] .............................................. H01M 4/86
[52] U.S. Cl. ........................................ 429/39; 429/40
[58] Field of Search ............................. 429/38, 39, 40

[56] References Cited

U.S. PATENT DOCUMENTS

| | | | |
|---|---|---|---|
| 3,394,032 | 7/1968 | Danner | 429/39 |
| 4,125,676 | 11/1978 | Maricle et al. | 429/38 |
| 4,159,367 | 6/1979 | Berchielli et al. | 429/38 |
| 4,169,917 | 10/1979 | Baker et al. | 429/39 |

Primary Examiner—Donald L. Walton
Attorney, Agent, or Firm—Hugh W. Glenn; Robert J. Fisher; Judson R. Hightower

[57] ABSTRACT

An integrated current collecting electrode for a molten carbonate fuel cell includes a corrugated metal conductive strip positioned in contact with a catalyst layer. The corrugations of the metal strip form a plurality of gas channels immediately adjacent the surface of the catalyst through which a reactant gas flows. Each channel is filled with a particulate material to maintain separation between the metal strip and the catalyst in ensuring gas channel integrity. The catalyst may be in the form of a compacted, particulate material provided the particle size of the material within the gas channels is larger than that of the catalyst particles to prevent catalyst migration to the metal conductor and provide reactant gas access to the catalyst layer. The gas channels formed by the corrugations of the metal strip are arranged in an offset pattern along the direction of gas flow for improved reactant gas distribution to the catalyst layer. The particulate material positioned within the gas flow channels may be a ceramic conductor such as a perovskite or a spinel for enhanced current collection.

19 Claims, 1 Drawing Figure

4,548,876

INTEGRATED CURRENT COLLECTOR AND CATALYST SUPPORT

CONTRACTUAL ORIGIN OF THE INVENTION

The United States Government has rights in this invention under Contract No. DE-AC01-79ET15440 between the U.S. Department of Energy and United Technologies Corporation.

BACKGROUND OF THE INVENTION

This invention relates generally to gaseous fuel cells and is particularly directed to a current collecting electrode for use in a molten carbonate fuel cell.

A molten carbonate fuel cell converts the chemical energy of gasifier fuel gases directly into electricity without an intermediate conversion either to heat or to mechanical energy as in conventional power systems. The electrochemical fuel cell consists of two porous electrodes separated by an electrolyte contained within a porous matrix. Up to several hundred of these single-cell units can be assembled using sheet metal bipolar plates to form any size stack desired. The individual cells function as separate batteries coupled in series to provide an This type of energy source is referred to as a molten carbonate fuel cell because the electrolyte is in the form of a liquid at typical cell operating temperatures in the range of 550° C. to 750° C. The electrolyte is generally mixed so as to form a matrix with an inert particulate material which remains solid during cell operation to maintain spacing between the electrodes. Most molten carbonate fuel cell electrolytes are ternary or binary mixtures of, for example, lithium carbonate, potassium carbonate, and sodium carbonate. Anode electrodes for these cells may be, for example, nickel-, cobalt- or chromium-containing alloys. The cathode electrode is typically comprised of silver or nickel. A fuel gas consisting primarily of $H_2$ and CO is provided to the anode/electrolyte interface, with the $H_2$ and CO converted to $H_2O$ and $CO_2$, respectively, releasing electrons that are transferred via an external circuit to the cathode. At the porous lithiated nickel oxide cathode, oxidant gases consisting of $CO_2$ and $O_2$ combine with the anodically produced electrons to form carbonate ions $CO_3^{2-}$. The ion thus produced is then transferred from the cathode through the electrolyte to the anode in completing the reaction circuit, at which point the carbonate ion is available to react with the $H_2$ and/or CO fuel gas.

The catalyst is typically comprised of a ceramic conducting material such as a perovskite containing lanthanum, strontium, cobalt or nickel having properties making it suitable for use as a catalyst in low temperature aqueous electrolyte cells, molten carbonate electrolyte and high temperature solid electrolyte cells. In operation, the fuel and oxidant gases are directed via a plurality of gas channels into contact with the anode and cathode catalysts where they react as previously described. Structural problems caused primarily by corrosion and dissolution of the various materials in the fuel cell have limited the commercial attractiveness of these power sources. For example, earlier approaches making use of sintered catalysts encountered problems with the corrosion and dissolution of the perovskite utilized therein. In addition, because it was generally required that the catalyst be comprised of a sinterable material, many nonsinterable particulates were eliminated as catalysts in gaseous fuel cells in spite of the fact that their electrical properties were highly desirable for such applications. In some cases, a nonsinterable particulate typically in powder form was incorporated in a molten carbonate fuel cell by providing a perforated plate between the current collecting element and the catalyst. However, this increases the complexity and cost of fuel cell fabrication, particularly where large numbers of single-cell units are assembled in a stacked arrangement to form a large molten carbonate stacked fuel cell.

The present invention is intended to overcome the aforementioned limitations of the prior art by providing an integrated current collecting electrode with a catalyst support for use in a molten carbonate fuel cell. The integrated electrode arrangement of the present invention maintains catalyst-current collector separation while providing efficient reactant gas distribution to the catalyst.

OBJECTS AND SUMMARY OF THE INVENTION

Accordingly, it is an object of the present invention to improve the energy generating efficiency of a gaseous fuel cell.

It is another object of the present invention to provide an improved current collecting electrode for a molten carbonate fuel cell.

Yet another object of the present invention is to provide a current collecting electrode for a gaseous fuel cell which affords sufficient electrical contact with the cell's catalyst layer to ensure low electrical contact loss while allowing for sufficient reactant gas distribution to the catalyst layer to ensure low gas phase diffusion losses.

A further object of the present invention is to provide a current collecting electrode for use with a catalyst layer which does not exhibit particle-to-particle bonding.

Still another object of the present invention is to provide an integrated electrode for a molten carbonate fuel cell which is easily and inexpensively fabricated.

The present invention contemplates a current collecting electrode for use in a gaseous fuel cell which is comprised of an integrated structure including a corrugated metal strip positioned in electrical contact with a catalyst layer. The catalyst may be comprised of a sintered conductor or of a nonsinterable conducting material which is compacted and may include a burnout material such as a plastic binder which is consumed at cell operating temperatures in providing catalyst porosity. The corrugations form a plurality of elongated channels between the catalyst layer and the metal strip through which a reactant gas flows. Positioned within each channel is a loosely packed, irregularly shaped particulate material which prevents the catalyst layer from collapsing on the metal current collecting strip while providing good reactant gas diffusion to the catalyst layer. The particles may be either nonconductive or conductive for enhanced current collection and are larger in size than the particles of the unsintered, compacted catalyst. The particles between the electrical pick-up points and the pick-up points themselves between the catalyst layer and the metal current collecting strip hold the catalyst layer flat against the cell's electrolyte matrix providing good catalyst-to-matrix contact.

The gas channels are formed by offsetting adjacent corrugations of the current collecting metal strip along the direction of gas flow for improved reactant gas distribution to the catalyst layer. By thus confining and compacting the catalyst layer, catalysts having desirable electrical and gas diffusion characteristics but which do not possess particle-to-particle bonding may be used in the gaseous fuel cell. The present invention is particularly adapted for use in molten carbonate fuel cells and eliminates structural and material problems encountered in the prior art while improving gas cell energy generating efficiency.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawing wherein is shown a partially cutaway perspective view of a gaseous fuel cell incorporating an integrated current collector with catalyst support in accordance with the principles of the present invention.

DESCRIPTION OF THE PREFERRED EMBODIMENT

Figure 1:
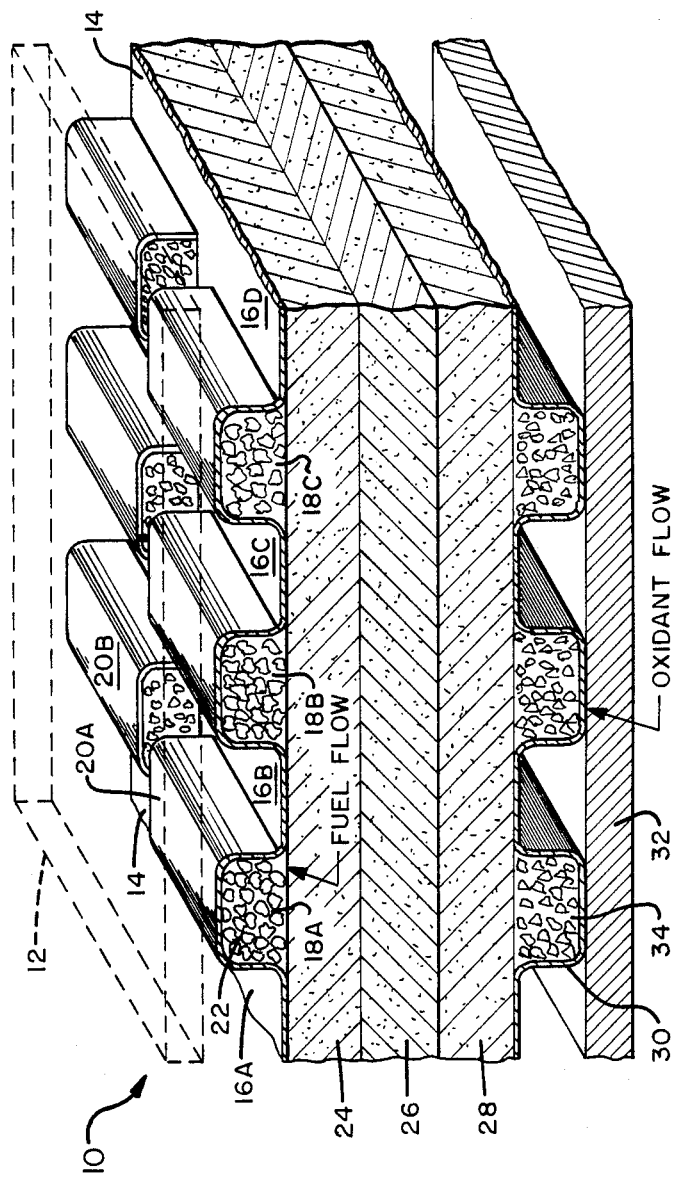

Referring to the FIGURE, there is shown a partially cutaway perspective view of a gaseous fuel cell 10 incorporating an integrated current collector with a catalyst support in accordance with the present invention.

Shown in the FIGURE is a single gaseous fuel cell 10 which typically would be used in combination with a plurality of generally vertically stacked, identical gaseous fuel cells arranged to form a stacked cell power system. With the gaseous fuel cell 10 arranged in such a stacked fuel cell power system, identical fuel cells would be positioned immediately above and below the gaseous fuel cell 10 of the FIGURE and would be respectively separated therefrom by an upper separator plate 12 (shown in the FIGURE in dotted line form) and a lower separator plate 32. Electric current is generated in the gaseous fuel cell 10 by the interaction of its electrodes with reactant gases flowing therein. Adjacent, vertically arranged fuel cells are electrically coupled by a respective separator plate positioned therebetween which serves as a current conductor and effectively connects immediately adjacent fuel cells in series.

Positioned immediately beneath and in contact with the upper separator plate 12 is a corrugated metallic electron collector 14. The metallic electron collector 14 includes a plurality of corrugations therein. These corrugations form a plurality of open gas channels 16A, 16B, 16C and 16D as well as a plurality of closed gas channels 18A, 18B and 18C. Each of the closed gas channels includes a plurality of support particles 22 therein as described below. From the FIGURE, it can be seen that immediately adjacent, aligned corrugated portions 20A, 20B are not in complete alignment with one another, but rather are slightly offset with respect to one another for purposes discussed below. The support particles 22 are preferably of an irregular, nonuniform shape and are large enough to provide good diffusion of reactant gas between the particles, as discussed below, and are sized so that they will not extrude or fall out of the holes in the side of the current collector 14.

Immediately beneath and in contact with alternating corrugated portions of the first metallic electron collector 14 is a cathode catalyst 24. The cathode catalyst 24 is preferably comprised of nickel oxide, the perovskites such as $LaMnO_3$, $LaNiO_3$, $LaCoO_3$, $La_2NiO_4$, or the spinels. The combination of catalyst 24 and the electron collector 14 forms the positive electrode, or cathode, of the gaseous fuel cell 10. Positioned beneath and in contact with the cathode catalyst 24 is an electrolyte matrix 26 which is comprised of a matrix layer saturated with an electrolyte. The matrix layer is preferably comprised of lithium aluminate particles surrounded by molten carbonate electrolyte.

Positioned immediately below and in contact with the electrolyte matrix 26 is an anode catalyst 28 which is also preferably comprised of lanthanum, strontium, cobalt, nickel or some other perovskite or a spinel. Positioned immediately beneath and in contact with the anode catalyst 28 is an electron collector 30 which, similar to the metallic electron collector 14 discussed above, is comprised of a plurality of corrugations which alternately are empty and filled with support particles 34. Positioned beneath and in contact with the corrugated portions of the electron collector 30 is a lower separator plate 32 which forms the lower boundary of the gaseous fuel cell 10. The combination of catalyst 28 and the electron collector 30 forms the negative electrode, or anode, of the gaseous fuel cell 10. As in the case of the metallic electron collector 14, the electron collector 30 includes a plurality of offset corrugated portions which are not shown in the FIGURE, but which are immediately adjacent to and continuous with a respective one of the corrugated, outer portions of the electron collector 30 shown in the FIGURE. As in the case of the upper separater plate 12, the lower separator plate 32 forms an electrical conducting boundary between the gaseous fuel cell 10 and another fuel cell (not shown) positioned in contact with and immediately beneath the gaseous fuel cell 10 of the FIGURE. Both separator plates provide for the conduction of electrons between immediately adjacent, stacked fuel cells which are thus coupled in series. Similarly, the cathode catalyst 24 as well as the anode catalyst 28 may include a burnout material such as a plastic binder for providing porosity in the catalyst.

An oxidant gas such as $O_2$ and $CO_2$ is provided between the upper separator plate 12 and the cathode catalyst 24 and flows through the passages formed by the corrugated portions of the metallic electron collector 14. Oxidant gas provided to the closed gas channels 18A, 18B and 18C flows through the channel formed by a corrugated portion of the metallic electron collector 14 and diffuses to the upper surface of the cathode catalyst 24. Similarly, a portion of the oxidant gas which is provided between adjacent corrugated portions of the metallic electron collector 14 and to the open gas channels 16A through 16D flows into a second tier of corrugated portions of the metallic electron collector 14 which also are filled with a plurality of support particles 22. For example, a portion of the oxidant gas introduced into the closed gas channel 18A formed of the corrugated portion 20A of the metallic electron collector 14 will flow through the immediately adjacent, contiguous closed gas channel formed of the corrugated portion 20B. In addition, a portion of the fuel gas which flows through the open gas channel 16B will be introduced into the closed gas channel formed by the corrugated portion 20B of the metallic electron collector 14 because of the offset alignment of immediately adjacent corrugated portions thereof. Thus, as the oxidant gas diffuses through a closed gas channel and into the cathode catalyst 24 it is absorbed thereby. In order to provide a continuous and uniform fuel gas flow across the upper portion of the cathode catalyst 24, the corrugated portions of the metallic electron collector 14 are slightly offset with respect to one another while still providing a continuous, particle-filled channel for enhanced oxidant gas diffusion therein.

A similar arrangement is shown for that of the anode portion of the gaseous fuel cell 10, wherein the corrugated portions of the electron collector 30 define linear gas channels between the anode catalyst 28 and the lower separator plate 32. These linear gas channels are likewise filled with a plurality of gas diffusion particles 34 which provide for the diffusion of the fuel gas, which is typically a mixture of $H_2$ and/or CO, for interacting with the anode catalyst 28 in reacting with the carbonate ion $CO_3^{2-}$. The carbonate ion is transferred from the cathode catalyst 24 through the electrolyte matrix 26 to the anode catalyst 28 in completing the reaction circuit, at which point the carbonate ion is available to react with the fuel gas of $H_2$ and/or CO in producing electrons.

The particles 22 within the metallic electron collector 14 as well as the particles 34 in the electron collector 30 have thus far been described primarily in the role of diffusing the reactant gas. However, these particles perform another important function in that they provide support for a respective catalyst immediately adjacent to and in contact with the metallic electron collector 14 and the electron collector 30. By thus supporting a catalyst and preventing it from contacting and collapsing upon a respective current collector along the gas channels, the catalysts used in the gaseous fuel cell 10 need not be of the sintered type and may be comprised of a compacted powder or other particulate material. With a particulate-type of catalyst, the support particles within a closed gas channel must generally be larger in size than the particles of the immediately adjacent catalyst. The larger support particles prevent the catalyst particles from migrating to the adjacent current collector or from collapsing upon the current collector in maintaining proper spacing therebetween and ensure the diffusion of the reactant gas into the catalyst.

In a preferred embodiment, the support particles are comprised of nonconducting alumina. However, the support particles may also be comprised of the same material as used in the anode and cathode catalysts 28, 24, i.e., perovskites or spinels. The use of such conductive materials within the closed gas channels enhances current collection and improves the efficiency of the gaseous fuel cell. In a preferred embodiment, each of the anode and cathode catalysts 28, 24 is comprised of particles in the range of 10–20 microns, while the support particles are generally on the order of 150–175 microns in diameter. The support particles within each set of enclosed gas channels are loosely packed and of irregular shape to enhance gas diffusion.

There has thus been shown an integrated current collector with catalyst support for use in a gaseous fuel cell which provides enhanced gas diffusion and catalyst support for maintaining separation between the catalyst and the current collector within the fuel cell. The integrated current collector with catalyst support permits the use of compacted, particulate electrodes within gaseous fuel cells rather than sintered electrodes thus providing greater flexibility in the choice of fuel cell materials. The collections of particles within gas diffusion channels may be either nonconductive in maintaining spacing between the catalyst and the current collector or they may be conductive such as a ceramic conductor for providing enhanced current collection also.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. An electrode for use in a gaseous fuel cell wherein a reactant gas is introduced for generating electrical energy, said electrode comprising:
   a generally flat, planar catalyst responsive to said reactant gas for effecting the ionization thereof, said catalyst comprised of a first compressed, particulate material;
   a current collector positioned immediately adjacent to and in electrical contact with a generally flat surface of said catalyst for carrying an electrical current arising from the ionization of the reactant gas, said current collector including a plurality of elongated, generally linear corrugations therein forming alternating closed and open channels along the flat surface of said catalyst through which the reactant gas is circulated; and
   a second particulate material positioned within said gas carrying closed channels along the length thereof for maintaining spacing between said catalyst and said current collector along said closed channels and diffusing the reactant gas into said catalyst.

2. The electrode of claim 1 wherein said second particulate material is comprised of particles larger than the particles of said first particulate material.

3. The electrode of claim 2 wherein the particles of said second particulate material are generally 150 to 175 microns in diameter and the particles of said first particulate material are generally 10 to 20 microns in diameter.

4. The electrode of claim 1 wherein said current collector is comprised of metal.

5. The electrode of claim 1 wherein said catalyst is comprised of a ceramic conductor.

6. The electrode of claim 5 wherein said ceramic conductor is a perovskite.

7. The electrode of claim 5 wherein said ceramic conductor is a spinel.

8. The electrode of claim 1 wherein said second particulate material is alumina.

9. The electrode of claim 1 wherein said second particulate material is electrically conductive for increased current collection.

10. The electrode of claim 9 wherein said second particulate material is comprised of a ceramic conductor.

11. The electrode of claim 10 wherein said ceramic conductor is a perovskite.

12. The electrode of claim 10 wherein said ceramic conductor is a spinel.

13. The electrode of claim 1 wherein the reactant gas is directed into the open channels between adjacent closed channels and wherein said closed channels are offset from one another along the direction of circulation of the reactant gas therethrough for introducing reactant gas into said closed channels along the length thereof.

14. The electrode of claim 1 wherein the reactant gas is comprised of a mixture of $H_2$ and CO.

15. The electrode of claim 1 wherein the reactant gas is comprised of a mixture of $CO_2$ and $O_2$.

16. The electrode of claim 1 wherein said catalyst includes a combustible binding material which is burned away at the gaseous fuel cell operating temperatures in providing porosity in said catalyst.

17. The electrode of claim 16 wherein said combustible binding material is comprised of a plastic binder.

18. The electrode of claim 1 wherein said gaseous fuel cell is a molten carbonate fuel cell.

19. The electrode of claim 1 further comprising an electrolyte matrix positioned in contact with a second surface of said catalyst, wherein said second surface is opposite and in facing relation to the generally flat surface of said catalyst with which said current collector is in contact.

* * * * *